United States Patent [19]

Chiu

[11] Patent Number: 5,309,414
[45] Date of Patent: May 3, 1994

[54] SIMPLE AND PORTABLE PARKING METER

[75] Inventor: Jacy Chiu, Jong-Her City, Taiwan

[73] Assignee: Neilson Chiu, Taipei Hsien, Taiwan

[21] Appl. No.: 54,542

[22] Filed: Apr. 27, 1993

[51] Int. Cl.[5] .......................... G04F 1/00; G07C 1/30; G06K 15/00

[52] U.S. Cl. ...................................... 368/90; 235/380; 364/463

[58] Field of Search .................. 368/90; 364/464–467; 235/378–384; 194/211, 239

[56]  References Cited

U.S. PATENT DOCUMENTS

| | | | |
|---|---|---|---|
| 4,460,965 | 7/1984 | Trehn | 364/464 |
| 4,532,418 | 7/1985 | Meese et al. | 235/381 |
| 4,717,815 | 1/1988 | Tomer | 235/378 |
| 4,861,971 | 8/1989 | Chan | 235/384 |
| 4,880,097 | 11/1989 | Speas | 194/239 |
| 5,166,680 | 11/1992 | Ganot | 340/932.2 |
| 5,173,883 | 12/1992 | Ilie et al. | 368/90 |

Primary Examiner—Vit W. Miska
Attorney, Agent, or Firm—Pro-Techtor International

[57] ABSTRACT

A portable parking meter including a main device and at least a sub-device; The body of the main device has two inserting slots for some sub-devices and is provided on the front face thereof with a control panel, the inserting slots are provided with some card interfaces capable of communicational connection with the main device when the sub-devices insert therein; The main device has a CPU which uses a reset loop connected peripherally with a keyboard interface, an oscillating loop and a LCD loop, and which has its internal timing program to establish the communication between it and the sub-devices, and it can count sequentially by the rate of value preset in the sub-devices for timing or reckonning times and deducting amount of charges in the sub-devices as a parking fee.

3 Claims, 5 Drawing Sheets

SIMPLE AND PORTABLE PARKING METER

BACKGROUND OF THE PRESENT INVENTION

The present invention relates to the structural device of a portable parking meter comprising principally a main device capable of being inserted by and having communication with at least one sub-device. When in communication, it can count sequentially by the rate of value preset in the sub-devices and choose a kind of calculating unit for reckonning charges as a parking fee.

The traditional parking meters now available are mechanical meters fixedly installed at the parking positions of cars, and because the mechanical structures thereof are subjected to the affection of humidity as well as vibration leading to failure; such failure bothers frequently the users of the old fachsioned meters, while it is not easy to be solved, this is a big disadvantage resided in today's parking fee system. In this view, it is wanted pressingly to design a simple as well as portable parking meter to get rid of the defects of the existing meters.

SUMMARY OF THE INVENTION

The principal object of the present invention is to design a simple as well as portable parking meter which comprises a main device for counting charges and is prepared by users on their own, and comprises several kinds of sub-devices each being in the type of a insertable monetary card which can be bought at the fee stations. The sub-devices can be insertion connected with the main device, and can be read through the communication interface between them the balance remained in the sub-device, a user can choose a controlling function through the CPU of the main device to deduct therefrom the fee counting by a preset rate of value. In this way, a simple parking meter is established.

A subordinative object of the present invention is to provide the sub-devices with two inserting slots on the main device, in case an old sub-device remains no enough amount of charges, a new sub-device inserted in the same time can be used for complement, such that the defect of overtime and deficiency in monetary card can be avoided.

Another object of the present invention is to provide in the main device the functions for timing and reconning times and setting of rate of fee etc., so that a main device can be adapted to various types of fee collecting in different parking fields, and thus is convenient in use.

The present invention is further described in detail by a preferred embodiment thereof referring to the accompanied drawings.

BRIEF DESCRIPTION OF THE DRAWINGS

Referring to FIGS. 1-3, the present invention comprises a main device 10 for reckonning fee and at least a sub-device 20 for reckonning fee; wherein the main device 10 has therein a CPU 11, connected peripherally thereto are an electric power loop 12, a reset loop 13, a keyboard loop 14, an oscillating loop 15, two card interface loops 16 and an LCD loop 17; wherein the CPU 11 does the functions of fee reconning and timing through the coordination of the above listed elements, and provides the LCD 17 with a displaying signal, and transmits the signal for deducting the rates of charges to the sub-devices 20 via the two card interface loops 16. The electric power loop 12 is used for turning on/off the power under the control of a power key 141 on the front panel of the main device 10; The reset loop 13 is operated to adjust the rate of charges and set a predetermined parking time in cooperating with a setting key 142 appeared on the front panel of the main device; The keyboard loop 14 has the power key 141, the setting key 142, an actuating key 143 and a times reconning key 144 to control the functions of turning on/off power, rates of charges and parking time reconning, actuating and choosing the mode of charges reconning etc. respectively; The oscillating loop 15 provides the CPU and the timing and times reconning units with oscillating reconning functions; While the card interface loops 16 are installed within the inserting slots 161 provided in the main device 10, for connecting with the sub-devices 20; And the LCD loop 17 shows respectively parking time 172, setting of the rate of charges 173, balance 174 remained on one sub-device, fee based on times reconning 175 and weak power displaying 176 etc.

Figure 1:
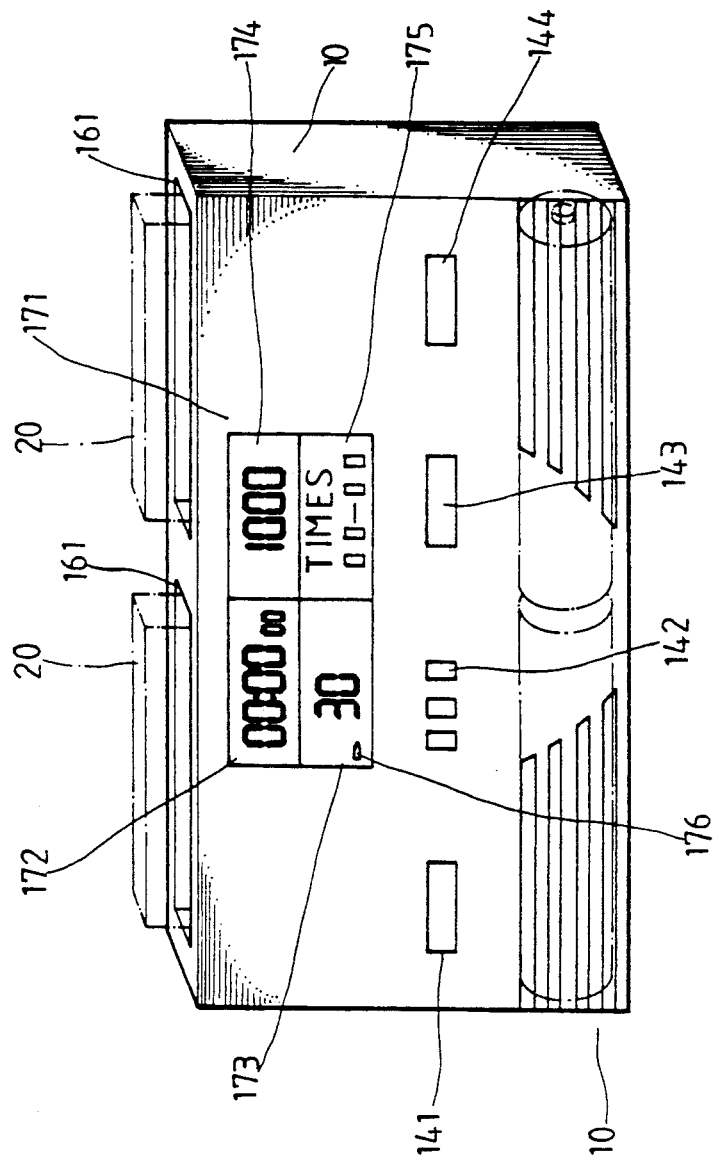
FIG. 1 is a perspective view of one embodiment of the present invention.
Figure 2:
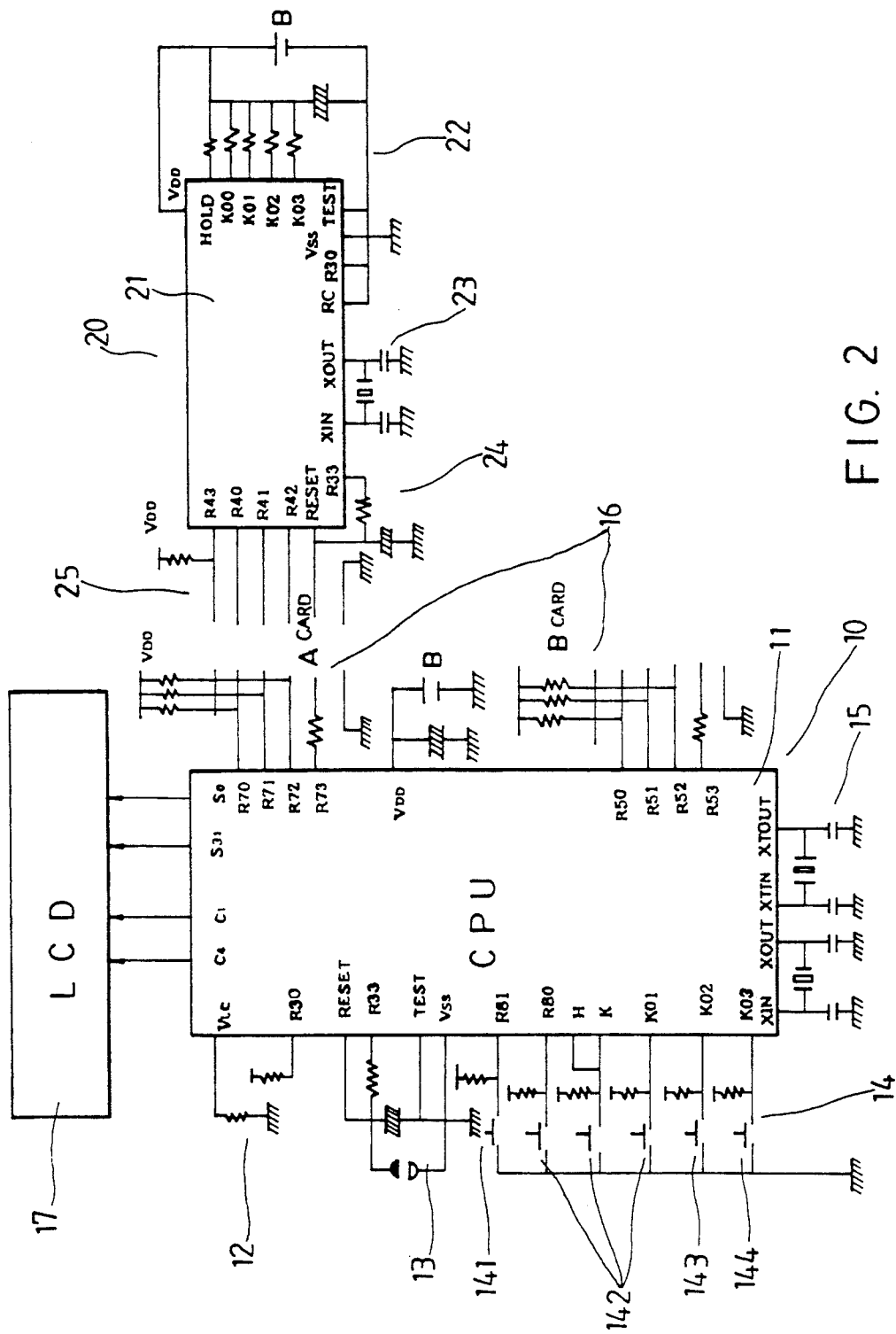
FIG. 2 is a schematic view of the electronic structure of the present invention.
Figure 3:
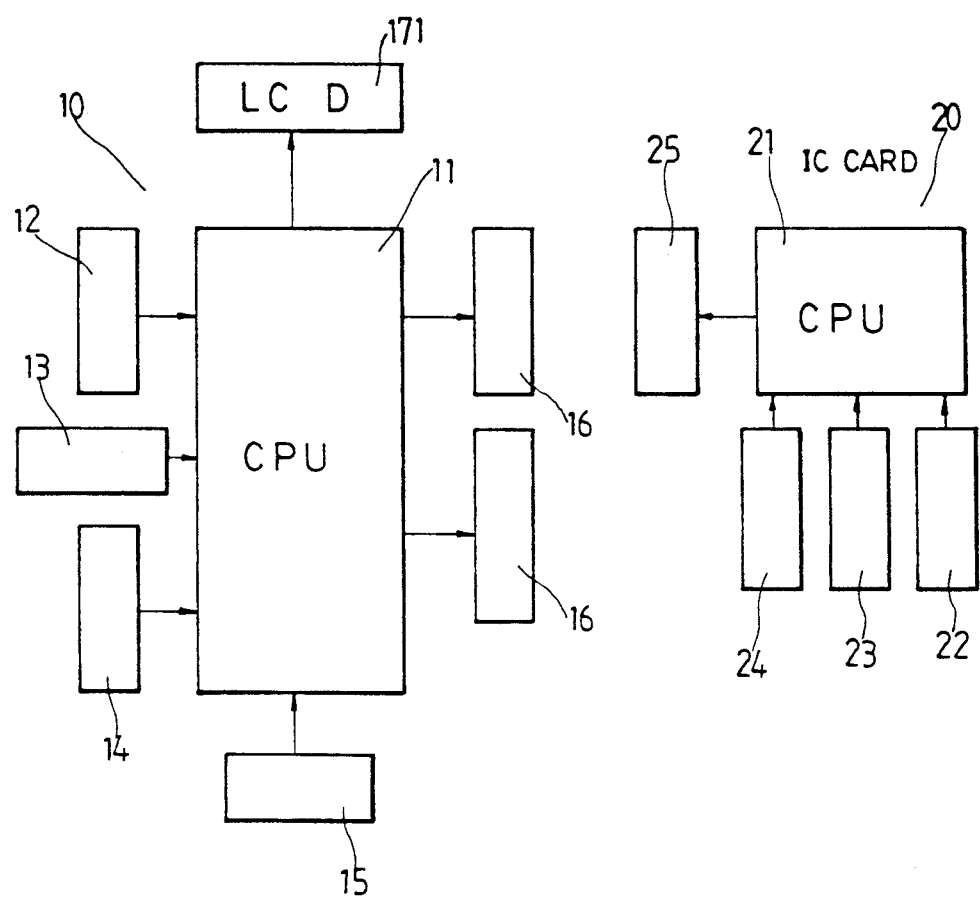
FIG. 3 is a schematic view in a block diagram of the systematic structure of the present invention.

Each sub-device 20 is in a form of IC card having a CPU 21, and connected peripherally thereto are a electric power loop 22, an oscillating loop 23, a reset loop 24 and a card interface loop 25 etc.; The electric power loop 22 provides the whole meter with electric power; The oscillating loop 23 provides the CPU 21 with time signals for deducting rates of charges; The reset loop 24 provides the CPU 21 with resetting signals through the signals received from the card interface loop 25; The card interface loop 25 is used to establish a communication interface between the main device 10 and the sub-devices 20 when it is connected with the card interface loop 16 of the main device 10.

Figure 4:
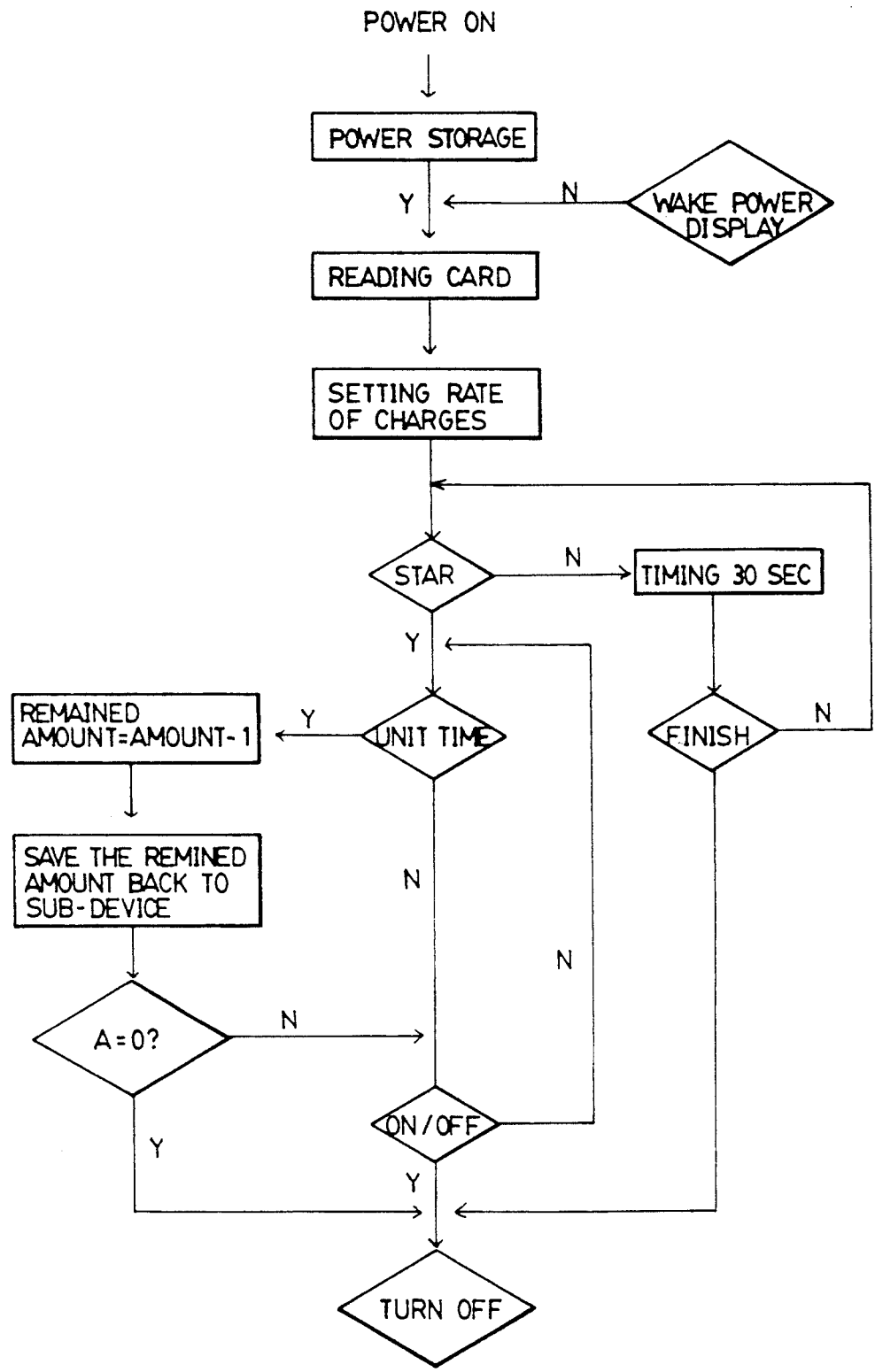
FIG. 4 is a flow chart showing the timing and fee collecting process of the present invention.
Figure 5:
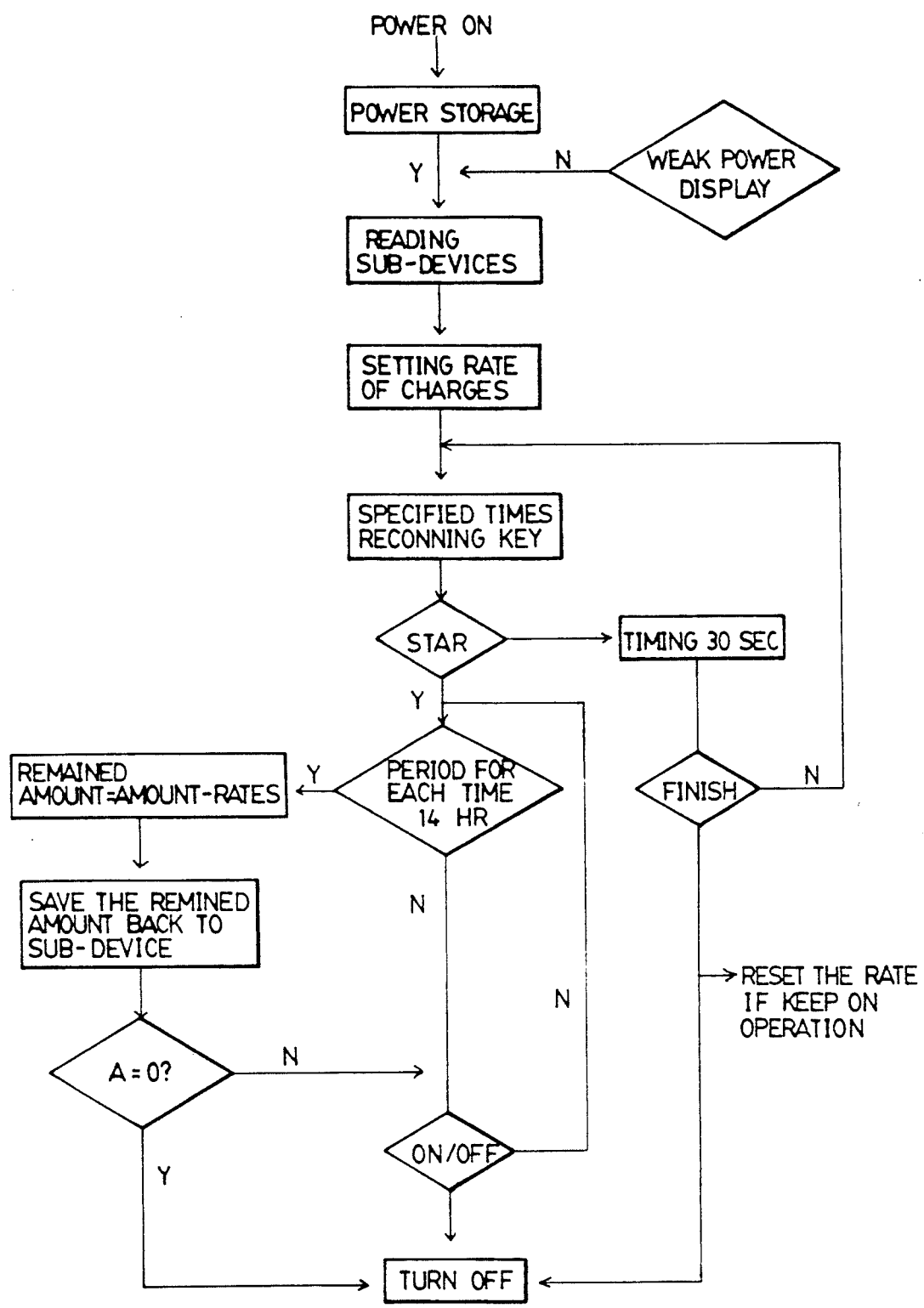
FIG. 5 is a flow chart showing the times reconning and fee collecting process of the present invention.

According to the above narrated structural design, as referring to FIGS. 4-5, an operator can insert the sub-devices 20 individually into the inserting slots 161, then push down the electric power key 141, if the timing charging mode is chosen now, the setting key 142 should be pushed down to set the rate of charges 173 per time unit and set the predetermined parking time 175; and if the times reconning charging mode is chosen, the specified times reconning key 144 should be pushed down and the same be the setting key 142 to set the rate of charges 173 for each time; then the operator can push down the actuating key 143, the main device 10 will start to operate thereby and deduct the amount from the balance remained on the sub-devices 20 by time units or by times; if the parking time is coincident with the predetermined parking time during operation, the main device 10 will stop operating, this can save money for the user if it is a period free of charge then; when a parking is finished, the user can turn off the power key 141 and take off the sub-devices to stop fee reconning.

A user can take a parking meter specified above with himself, there is no problem of detriment of a fixed parking meter; The portable meter can be adjusted to suit various types of fee reconning (by reconning time units or times) in various parking fields; This structure have been designed in consideration of various situations a user can meet in practice to alleviate trouble which can be created to the user.

Having thus described my invention, obviously, many modifications and variations of the present invention are possible in the light of the above teaching. It is therefore to be understood that within the scope of the appended claims, the invention may be practised otherwise than as specifically described.

I claim:

1. A simple and portable parking meter comprising:
   a main device for reckoning fees and at least one sub-device insertable into a plurality of slots on said main device, there being one or more sub-devices issued to a person parking his vehicle in an area to be monitored by the main device, the person being able to use a second of the sub-devices when a first of said sub-devices does not by itself have sufficient authorization capacity to allow of the parking area, the use of the second sub-device ensuring that no violation is charged to the person parking his vehicle; wherein
   said main device has a CPU to which are connected peripherally an electric power loop, a reset loop, a keyboard loop, an oscillating loop, two or more card interface loops, and an LCD loop,
   said CPU performing the functions of fee reckoning and timing through the coordination of the above listed elements, providing said LCD with a displaying signal, and transmitting a signal for deducting charges from said sub-devices via the card interface loops,
   said electric power loop being used for turning on and off the power, the power loop being activated by a power key on a front panel of said main device,
   said reset loop adjusting the rate of charges and setting a predetermined parking time in cooperation with a setting key located on the front panel of said main device,
   said keyboard loop including said power key, said setting key, and actuating key, and a time reckoning key to control functions including turning on and off the power, determining the rates of charges and calculating the amount of parking time, and actuating and choosing the mode of charge reckoning,
   said oscillating loop providing said CPU with oscillation reckoning functions;
   said card interface loops being connected to said slots in said main device so as to communicate with said sub-devices; and wherein
   messages displayed by said LCD loop including parking time, the rate of charges, balance remaining on a sub-device, fee based on the time parked, and low power warning.

2. The parking meter as claimed in claim 1 wherein: the number of said sub-devices is two.

3. The parking meter as claimed in claim 1 wherein: said setting key is an on/off key which switches between two set values.

* * * * *